(12) United States Patent
Zhang

(10) Patent No.: US 9,142,918 B2
(45) Date of Patent: Sep. 22, 2015

(54) CARD CONNECTOR WITH EJECTOR

(71) Applicant: HON HAI PRECISION INDUSTRY CO., LTD., New Taipei (TW)

(72) Inventor: Wei-De Zhang, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/450,531

(22) Filed: Aug. 4, 2014

(65) Prior Publication Data

US 2015/0044890 A1   Feb. 12, 2015

(30) Foreign Application Priority Data

Aug. 6, 2013 (CN) .......................... 2013 2 04752200

(51) Int. Cl.
| H01R 13/635 | (2006.01) |
| H01R 12/72 | (2011.01) |
| G06K 13/08 | (2006.01) |

(52) U.S. Cl.
CPC .......... *H01R 13/635* (2013.01); *G06K 13/0812* (2013.01); *H01R 12/721* (2013.01); *G06K 2209/27* (2013.01)

(58) Field of Classification Search
CPC . G06K 13/0812; H01R 13/635; H01R 12/721
USPC .................................. 439/152–160
See application file for complete search history.

(56) References Cited

U.S. PATENT DOCUMENTS

| 6,089,890 | A * | 7/2000 | Oguchi et al. ................. | 439/159 |
| 6,230,978 | B1 * | 5/2001 | Koseki et al. ................. | 235/475 |
| 6,361,339 | B1 * | 3/2002 | Zhang et al. .................. | 439/160 |
| 6,948,961 | B2 * | 9/2005 | Oguchi .......................... | 439/160 |
| 6,955,548 | B1 * | 10/2005 | Wang et al. .................... | 439/159 |
| 7,175,452 | B1 * | 2/2007 | Lin et al. ........................ | 439/159 |
| 7,198,497 | B1 * | 4/2007 | Lai et al. ........................ | 439/159 |
| 7,766,678 | B1 * | 8/2010 | Abe .............................. | 439/159 |
| 8,414,316 | B2 * | 4/2013 | Zhang .......................... | 439/159 |
| 8,419,454 | B1 * | 4/2013 | Ji et al. .......................... | 439/159 |
| 8,747,131 | B2 | 6/2014 | Nakase et al. | |
| 2004/0018761 | A1 * | 1/2004 | Akasaka et al. .............. | 439/159 |
| 2004/0266267 | A1 * | 12/2004 | Inaba ........................... | 439/630 |
| 2011/0070760 | A1 * | 3/2011 | Zhang .......................... | 439/159 |
| 2012/0276764 | A1 * | 11/2012 | Nakase et al. ................ | 439/159 |

* cited by examiner

*Primary Examiner* — Briggitte R Hammond
(74) *Attorney, Agent, or Firm* — Ming Chieh Chang; Wei Te Chung

(57) ABSTRACT

A card connector (100) includes an insulative housing (1), a number of contacts (2) retained in the insulative housing, a metal shield (3) covering the insulative housing for defining a receiving space (10), an ejector comprising an operating member (4), and an actuating member (5) actuated by the operating member. The actuating member includes a post (51) located in the insulative housing, a pivoting plate (52) pivotedly assembled on the post, and a torsion spring (50). The torsion spring has a helical portion (501) installed around the post, a first flexible beam (5021) retaining with the pivoting plate, and a second flexible beam (5022) secured with the operating member.

20 Claims, 6 Drawing Sheets

CARD CONNECTOR WITH EJECTOR

BACKGROUND OF THE INVENTION

1. Field of the Invention

The present invention relates generally to a card connector, and more particularly to a card connector with a user-friendly ejector.

2. Description of Related Arts

Taiwan Pat. No. TW201301680 discloses a card connector including an insulative housing, a plurality of contacts retained in the insulative housing, a metal shield covering the insulative housing for defining a receiving space, a tray member receivable in the receiving space, and an ejector for ejecting an inserted tray member from the receiving space. The insulative housing has a protruding post. The ejector comprises an operating portion oriented by the post and movable along an insertion/ejection direction, and an actuating portion in contact with the operating portion for being moved by the operating portion to eject an inserted tray member along the ejection direction.

China Pat. No. CN202585891 discloses another card connector including an insulative housing, a plurality of contacts retained in the insulative housing, a metal shield covering the insulative housing for defining a receiving space, a tray member receivable in the receiving space, and an ejector for ejecting an inserted tray member from the receiving space. The insulative housing has a protruding post. The ejector comprises an operating portion movable along an insertion/ejection direction, and an actuating portion oriented by the post and contacting with the operating portion. The actuating portion rotates about the post when actuated by the operating portion for ejecting an inserted tray member along the ejection direction.

In each of the two prior art card connectors mentioned above, the operating portion and the actuating portion are merely in contact with each other but not secured together such that when the actuating portion is moved by the operating portion, there is noise between the actuating portion and the operating portion. Furthermore, feeling of pushing operation or movement is not good if the operating portion is not accurately positioned with respect to the actuating portion.

A card connector with an ejector that obviates noise during operation and has good operation feeling is desired.

SUMMARY OF THE INVENTION

Accordingly, an object of the present invention is to provide a card connector with an ejector preventing scrapping noise and having good operating feeling.

To achieve the above object, a card connector includes an insulative housing, a plurality of contacts retained in the insulative housing, a metal shield covering the insulative housing for defining a receiving space, an ejector comprising an operating member and an actuating member actuated by the operating member. The actuating member includes a post located in the insulative housing, a pivoting plate pivotally assembled on the post, and a torsion spring having a helical portion installed around the post, a first flexible beam retaining with the pivoting plate, and a second flexible beam secured with the operating member.

Other objects, advantages and novel features of the invention will become more apparent from the following detailed description when taken in conjunction with the accompanying drawings.

DETAILED DESCRIPTION OF THE PREFERRED EMBODIMENT

Figure 1:
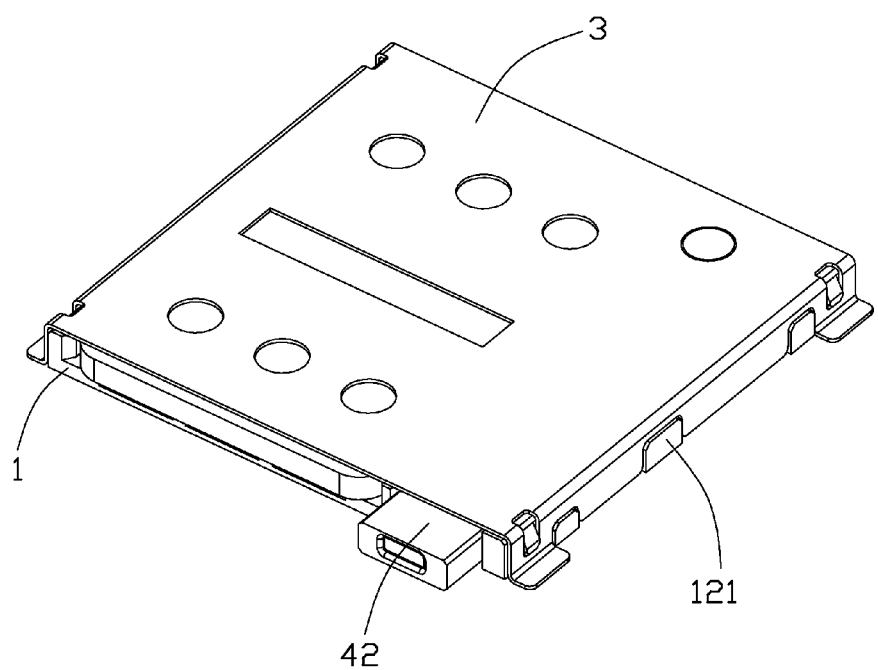
FIG. 1 is a perspective, assembled view of a card connector constructed in accordance with the present invention with a card inserted therein.

Reference will now be made in detail to the preferred embodiment of the present invention.

Referring to FIGS. 1-6, a card connector 100 of the present invention used for receiving an electrical card, comprises an insulative housing 1, a plurality of contacts 2 retained in the insulative housing 1, a metal shield 3 covering the insulative housing 1 for defining a receiving space 10, an ejector assembled on the insulative housing 1, and a metal plate 6 attached to a bottom face of the base 11. The terms "upper, lower, front, rear, left, and right" are referring to FIG. 1, not meant to be limiting but is descriptive of depiction according to the claims. Therefore, an insertion/ejection direction is defined.

Figure 4:
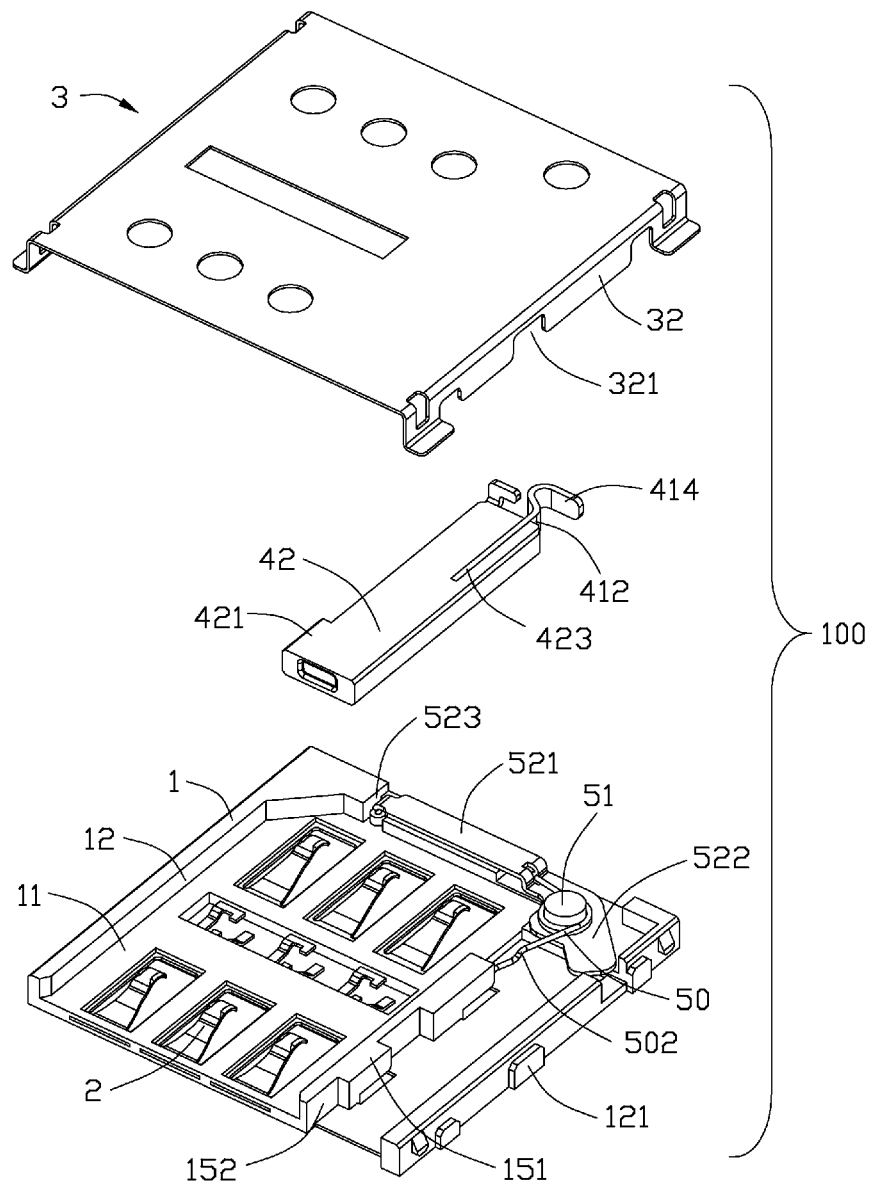
FIG. 4 is a second perspective, partly exploded view of the card connector.
Figure 5:
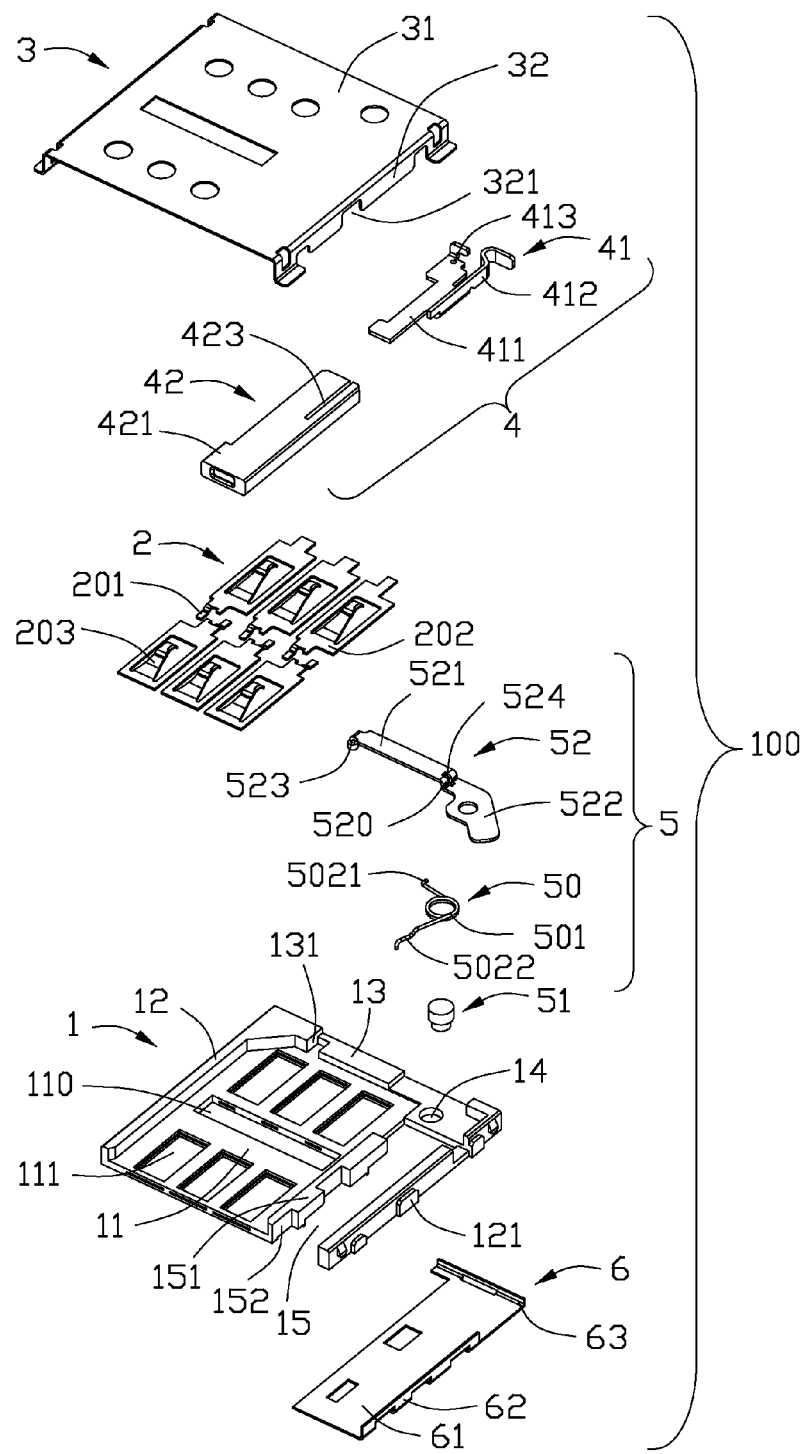
FIG. 5 is a perspective, fully exploded view of the card connector.

Referring to FIGS. 4 and 5, the insulative housing 1 comprises a base 11 and a pair of lateral walls 12 vertical to the base 11. The base 11 defines a plurality of passageways 111 and a transverse slot 110 is defined between the front-and-rear positioned passageways 111. Each lateral wall 12 has a plurality of protrusions 121 extending outwardly therefrom. The base 11 comprises a block portion 13 at a rear part thereof. A notch 131 is defines between the block portion 13 and the left lateral wall 12. A lengthwise slot 15 is spaced between the right lateral wall 13 and the base 11. The base 11 comprises a rib 151 protruding into the lengthwise slot 15 and a recess 152 at a rear part of the lengthwise slot 15. The base 11 defines a round hole 14 between the block portion 13 and the right lateral wall 12.

Referring to FIGS. 3-6, the contacts 2 are received in the passageways 111 of the insulative housing 1. Therefore, the contacts 2 are positioned in two front-and-rear rows. Each contact 2 comprises a soldering portion 201 extending into the transverse slot 110, a retaining portion 202 retained in the insulative housing 1, and a contacting portion 203 extending upwardly from the retaining portion 202 into the receiving space 10 for contacting with the electrical card. The soldering portions 201 of the contacts 2 are positioned in a single row. The soldering portions 201 of the front row contacts 2 and the soldering portions 201 of the rear row contacts 2 are alternatively arranged along a transverse direction perpendicular to the insertion/ejection direction.

Figure 2:
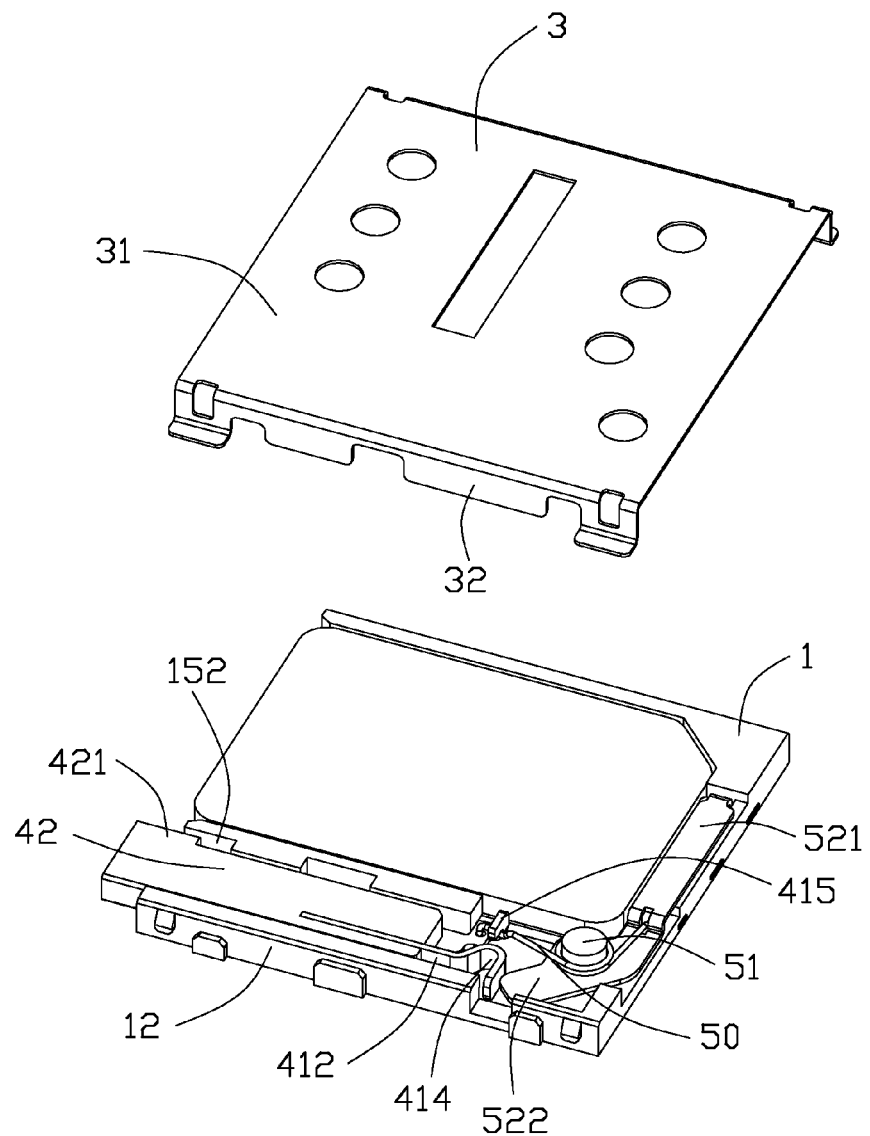
FIG. 2 is a perspective, partly exploded view of FIG. 1.
Figure 3:
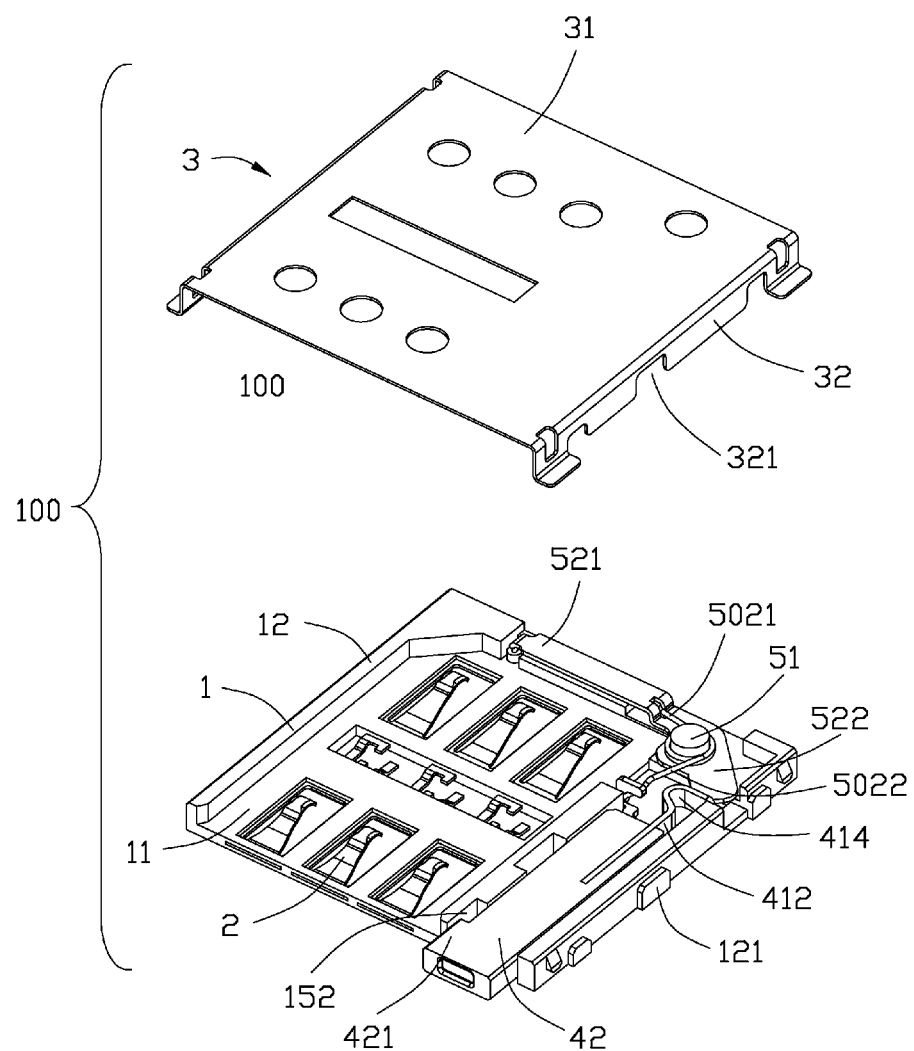
FIG. 3 is a first perspective, partly exploded view of the card connector.

Referring to FIGS. 2-4, the metal shield 3 comprises a main portion 31 and a pair of sidewalls 32 extending vertically and downwardly from the main portion 31. Each sidewall 32 defines a pair of apertures 321 correspondingly receiving the protrusions 121 of the insulative housing 1 so as to secure the metal shield 3 on the insulative housing 1.

Referring to FIGS. 2-6, the ejector comprises an operating member 4 and an actuating member 5 actuated by the operating member 4. The operating member 4 comprises a moveable plate 41 and a jacket member 42 retaining the moveable plate 41. The moveable plate 41 comprises a base portion 411 secured in the jacket member 42, a retaining plate 413 forwardly and leftward extending from the base portion 411, a hook portion 415 upwardly and transversely extending from the retaining plate 413, a bar portion 412 rightward and upwardly extending from the retaining plate 413, and a curved portion 414 formed at an end of the bar portion 412. The jacket member 42 is substantially box-shaped, comprising a bulge 421 laterally extending therefrom and defining a lengthwise extending slit 423 for moveably receiving the bar portion 412 of the moveable plate 41. The actuating member 5 comprises a post 51 assembled in the round hole 14 of the insulative housing 1, a pivoting plate 52 pivotally assembled on the post 51, and a torsion spring 53 installed around the post 51 and positioned on the pivoting plate 52. The pivoting plate 52 comprises a first arm 521 rotatably extending into the receiving space 10 and a second arm 522 angularly and integrally formed with the first arm 521. The first arm 521 is leveled above the second arm 522. The first arm 521 and the second arm 522 are steppedly connected with each other via a bent portion 520. The bent portion 520 is split to have a rip 524 at the middle thereof. The first arm 521 has a tail portion 523 bent therefrom and the tail portion 523 is received in the notch 131 of the insulative housing 1. The torsion spring 50 has a helical portion 501 and a pair of flexible beams 502 angularly extending from the helical portion 501. The flexible beams 502 comprises a first flexible beam 5021 retaining in the rip 524 of the pivoting plate 52 and a second flexible beam 5022 secured with the retaining plate 413 of the operating member 4. The second flexible beam 5022 is held below the hook portion 415 for preventing the torsion spring 50 from dropping down accidentally.

Figure 6:
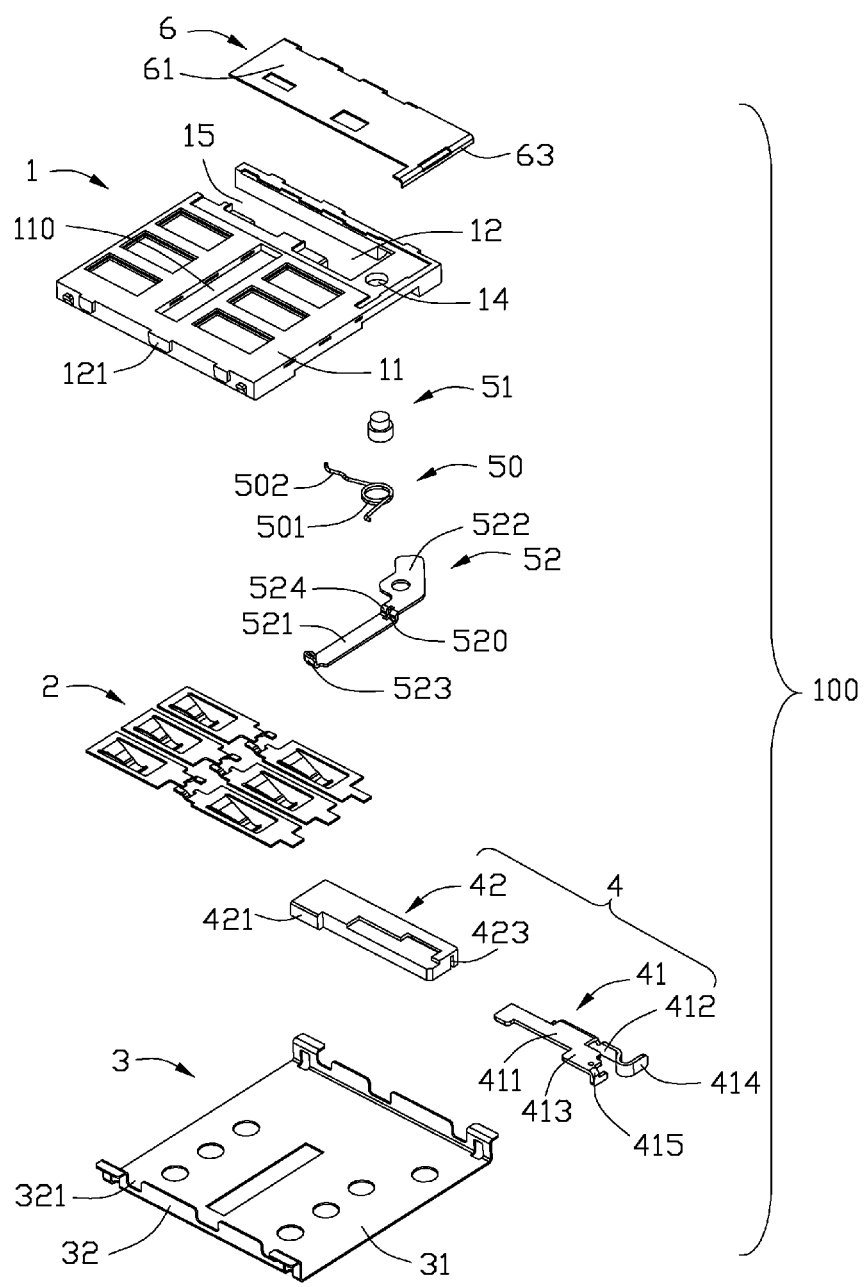
FIG. 6 is similar to FIG. 1, but taken along a different view.

Referring to FIGS. 5 and 6, the metal plate 6 comprises a main plate 61, a first securing plate 62 vertically and laterally extending from the main plate 61, and a second securing plate 63 vertically and transversely extending from front end of the main plate 61. The metal plate 6 is positioned below the operating member 4 and coplanar with the bottom face of the base 11.

Referring to FIG. 3, when the electrical card is not inserted and tile the electrical card is fully inserted in the receiving space 10, the first arm 521 of the pivoting plate 52 is positioned at the block portion 13 while the bulge 421 is received in the recess 152 and spaces away from the rib 151. The torsion spring 50 is not compressed because no force is actuated. During ejection of the electrical card, a user pushes the jacket member 42 to move in the lengthwise slot 15, the curved portion 414 pushes the second arm 522 of the pivoting plate 52 to rotate around the post 51, and therefore, the first arm 521 of the pivoting plate 52 moves into the receiving space 10 for eject the electrical card from the receiving space 10. The flexible beams 502 of the torsion spring 50 are compressed to have a reduced angle therebetween. Tile the bulge 421 comes in contact with the rib 151, the user pulls the electrical card out of the receiving space 10. Therefore, elasticity of the torsion spring 50 is released, and both the pivoting plate 52 and the jacket member 42 return to their original positions. In detail, the first flexible beam 5021 pushes the first arm 521 to return to the block portion 13. The first arm 521 moves forwardly, the pivoting plate 52 rotates around the post 51 to drive the second arm 522 to move backwardly, and therefore, the operating member 4 is pushed to move backwardly. Furthermore, the second flexible beam 5022 pushes the operating member 4 to move backwardly, too.

In the preferred embodiment, the torsion spring 50 of the card connector 100 is elastically connected with the pivoting plate 52 and the moveable plate 41, so the moveable plate 41 and the pivoting plate 52 are prevented from scrapping with each other, and therefore, scrapping noise is avoided. Understandably, the linkage between the torsion spring 50 and the moveable plate 41 may be in a sliding manner as the linkage between the torsion spring 50 and the pivoting plate 52. Moreover, one end of the torsion spring 50 may be linked to the immovable housing 1 instead of to the moveable plate 41.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector used for receiving a card, comprising:
an insulative housing;
a plurality of contacts retained in the insulative housing;
a metal shield covering the insulative housing for defining a receiving space; and
an ejector comprising an operating member and an actuating member actuated by the operating member, the actuating member comprising a post located in the insulative housing, a pivoting plate pivotedly assembled on the post, and a torsion spring having a helical portion installed around the post, a first flexible beam retaining with the pivoting plate, and a second flexible beam secured with the operating member.

2. The card connector as claimed in claim 1, wherein the first flexible beam and the second flexible beam angularly extend from the helical portion.

3. The card connector as claimed in claim 1, wherein the operating member comprises a moveable plate having a curved portion directly operating on the pivoting plate for actuating the pivoting plate to rotate around the post.

4. The card connector as claimed in claim 3, wherein the moveable plate has a retaining plate retaining the second flexible beam and a bar portion rightward and upwardly extending from the retaining plate, and the curved portion is formed at an end of the bar portion.

5. The card connector as claimed in claim 4, wherein the operating member comprises a substantially box-shaped jacket member retaining the moveable plate, the insulative housing defines a lengthwise slot, and the jacket member moves in the lengthwise slot during the card's ejection from the receiving space.

6. The card connector as claimed in claim 5, further comprising a metal plate positioned below the operating member and coplanar with a bottom face of the insulative housing.

7. The card connector as claimed in claim 4, wherein the movable plate comprises a hook portion upwardly and transversely extending from the retaining plate and the second flexible beam is held below the hook portion.

8. The card connector as claimed in claim 1, wherein the pivoting plate comprises a first arm rotatably extending into the receiving space and a second arm angularly and integrally formed with the first arm, and the first arm and the second arm are steppedly connected with each other via a bent portion and the first arm is leveled above the second arm.

9. The card connector as claimed in claim 8, wherein the bent portion is split to have a rip at the middle thereof and the first flexible beam is retained in the rip of the pivoting plate.

10. The card connector as claimed in claim 8, wherein the insulative housing defines a notch behind the receiving space, the first arm has a tail portion bent therefrom, and the tail portion is receivable in the notch.

11. An electrical connector comprising:
an insulative housing defining a card receiving space in communication with an exterior in a front-to-back direction;
a plurality of contacts disposed in the housing with contacting sections exposed into the card receiving space;
a metallic shielding attached to the housing to cover said card receiving space in a vertical direction perpendicular to said front-to-back direction;
an ejector including an operating member back and forth moveable along said front-to-back direction, and an actuating member moveable in a rotational manner about an axis extending in said vertical direction, and located behind and actuated by said operating member, and a torsion spring including one end linked to the operating member and the other end linked to the actuating member so as to urge the actuating member away from the operating member.

12. The electrical connector as claimed in claim 11, wherein the operating member includes an outer position contacting the actuating member, and an inner position linked to the torsion spring.

13. The electrical connector as claimed in claim 11, wherein the torsion spring and the actuating member share a same pivot axis during operation.

14. The electrical connector as claimed in claim 11, wherein said operating member includes a metallic plate actuating the actuating member, and an insulative jacket member holding the metallic plate in position within the housing.

15. The electrical connector as claimed 14, wherein the metallic plate contacts the actuating member and linked to the torsion spring.

16. An electrical connector comprising:
an insulative housing defining a card receiving space in communication with an exterior in a front-to-back direction;
a plurality of contacts disposed in the housing with contacting sections exposed into the card receiving space;
a metallic shielding attached to the housing to cover said card receiving space in a vertical direction perpendicular to said front-to-back direction;
an ejector including an operating member back and forth moveable along said front-to-back direction, and an actuating member moveable in a rotational manner about an axis extending in said vertical direction, and located behind and actuated by said operating member, and a torsion spring including one end linked to the actuating member and the other end linked to one of said housing and the operating member so as to urge the actuating member to be in a rear position.

17. The electrical connector as claimed in claim 16, wherein the operating member includes an outer position contacting the actuating member, and an inner position linked to the torsion spring.

18. The electrical connector as claimed in claim 16, wherein the torsion spring and the actuating member share a same pivot axis during operation.

19. The electrical connector as claimed in claim 16, wherein said operating member includes a metallic plate actuating the actuating member, and an insulative jacket member holding the metallic plate in position within the housing.

20. The electrical connector as claimed 19, wherein the metallic plate contacts the actuating member and linked to the torsion spring.

* * * * *